United States Patent [19]

Steele

[11] 4,200,412
[45] Apr. 29, 1980

[54] CONTROL FOR PNEUMATIC CONVEYING SYSTEM

[75] Inventor: James R. Steele, Stillwater, Minn.

[73] Assignee: Dynamic Air Incorporated, St. Paul, Minn.

[21] Appl. No.: 898,467

[22] Filed: Apr. 20, 1978

[51] Int. Cl.² .................................................. B65G 53/66
[52] U.S. Cl. .......................................... 406/22; 406/24; 406/131
[58] Field of Search ............... 302/35, 41, 42, 53, 302/17, 27, 49, 26; 222/56; 137/395, 396; 406/22, 23, 24, 130, 131, 128, 146

[56] References Cited

U.S. PATENT DOCUMENTS

| | | | |
|---|---|---|---|
| 3,428,366 | 2/1969 | Harvey | 302/42 |
| 3,489,464 | 1/1970 | Delfs | 302/42 X |
| 3,933,393 | 1/1976 | De Feudis | 302/27 |
| 3,955,853 | 5/1976 | Rusterholz | 302/17 |
| 4,098,541 | 7/1978 | Côté | 302/41 X |

Primary Examiner—James L. Rowland
Attorney, Agent, or Firm—Jacobson and Johnson

[57] ABSTRACT

A dense phase pneumatic conveying system with pressurized air applied at the source to deliver granular material through a conveying line to a receiver with a shut-off valve having an air leakage path located in the conveying line operated by a sensing element to limit the rate of flow of the pressurized air at the end of the conveying cycle.

6 Claims, 3 Drawing Figures

CONTROL FOR PNEUMATIC CONVEYING SYSTEM

BACKGROUND OF THE INVENTION

This invention pertains to systems for pneumatically conveying granular materials and, more specifically, to dense phase pneumatic conveying systems. More particularly, the invention is directed toward providing means for controlling and reducing the rush of the conveying gas at the end of the conveying cycle.

Pneumatic conveyors are used to transfer or carry a wide variety of granular materials such as sand, salt, flour, cement, etc. Basically, there are two general types of pneumatic conveying systems, dense phase and dilute phase. The basic difference is that the latter usually operates under a relatively low pressure but at a high velocity whereas the former operates at a higher pressure but a lower velocity. The instant invention is directed principally for use in the dense phase system. The dense phase system is best suited for handling heavy abrasive products and non-abrasive products where degradation cannot be tolerated. Because of the lower velocities at which the material is transported, the wear on the system components is minimized. In the dense phase system a positive pressure using a relatively small amount of gas is used to move a large amount of material. The conveying line is generally flooded with the granular material to be conveyed and then, by adding just the right portion of pressurized gas, usually air, to overcome frictional losses in the conveying line a dense flow is produced. The air does not necessarily carry the material in an air stream but has more of a pushing effect, much like extruding. In the dense phase flow the conveyed material is carried at a much slower velocity than what the air velocity would otherwise be or what the velocity of material flow would be in a dilute phase system.

In general the pressurized conveying air is applied at the source of the material, that is, in the pressure vessel where the material is temporarily held, sometimes referred to as a transporter, and the receiving vessel or container is usually at atmospheric pressure. Additional booster air may be applied along the conveying line to assist in conveying the granular material. When the source vessel and the conveying line are filled with the material, the pressurized air applied at the source vessel sees a vary high resistance and so the air flows at a relatively slow rate. However, as the conveyor approaches the end of the conveying cycle, that is, after most of the material has been moved to the receiver, then the resistance to the pressurized air decreases so the air now passes through the conveying line to the receiver at a greater velocity. Finally, right at the end of the conveying cycle the air rushes with a surge through the conveying line and arrives at the receiver with an impact. In general, at the receiver dust particles must be removed from the air before it is allowed to pass out to the atmosphere. Therefore, the dust collector or filter at the receiver has to be constructed to take the force of the impact due to the surge of air that arrives at the end of the conveying cycle and must also be capable of filtering out this rush of air.

SUMMARY

In a system for pneumatically conveying granular materials, a shut-off valve with an air leakage passageway is inserted in the conveying path and is closed when the conveyor approaches the end of the conveying cycle. A sensing probe in the conveying path controls the operation of the shut-off valve. The closing of the valve reduces the rate at which the pressurized air passes through the conveying line to the receiver at the end of the conveying cycle thereby eliminating the air surge that normally occurs and reducing the impact at the receiver and thereby lowering the design requirements for the dust collector or filter or other mechanisms at the receiver.

DESCRIPTION OF THE PREFERRED EMBODIMENTS

Figure 1:
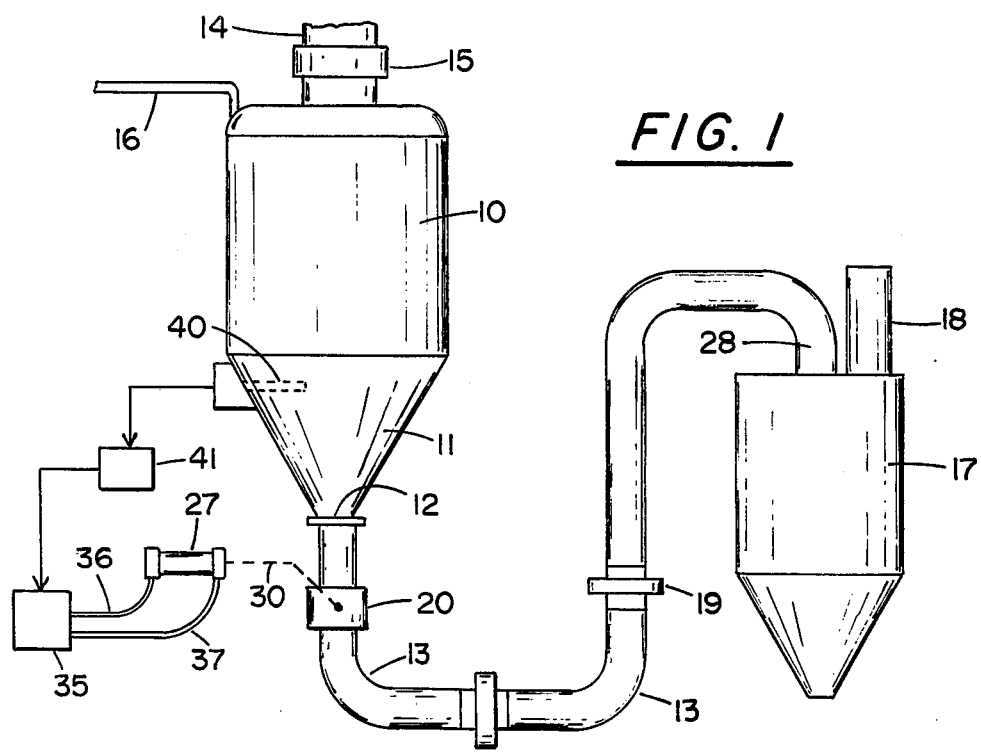
FIG. 1 is a functional illustration of a simplified sample pneumatic conveying system incorporating a shut-off valve in accordance with the teachings of the instant invention and illustrating its function.

An example of a very simple pneumatic conveyor installation is functionally illustrated in FIG. 1. A pressure vessel or transporter 10, constructed to specifications to withstand the pressures used in the system, has straight side walls and a conical lower portion 11 terminating in an outlet opening at 12 which feeds into a conveying line or pipe 13. At the topside of vessel 10 is an input line 14 containing a valve 15 through which the material to be transported is fed into the pressure vessel 10. This material may come from any of a number of different sources such as a railroad car, truck or storage silo. After pressure vessel 10 has been filled to the desired level, valve 15 is closed to seal off the inlet passageway 14. An air line 16 is coupled to the vessel 10 to provide the pressurized air used to convey the material. The vessel 10 may also be provided with an air outlet pipe, not shown, to be used when the vessel 10 is being fed by or through another pneumatic conveying line. Other structural and functional parts of the pressure vessel which are usually found in devices of this nature are not shown since they are commonly known and are not part of the invention nor important to the description of the operation of the invention.

Conveying line 13, which carries the material outputted from the transporter 10, runs to the topside of a storage silo 17 where the material is emptied into the silo 17 through an inlet opening 28 which would be similar to the inlet opening for transporter 10. The conveying line 13 may have a number of boosters 19 located along its length to provide additional air to assist in conveying the granular material from the transporter 10 to the storage silo 17. For the purposes of describing this invention it can be assumed that storage silo 17 is maintained at atmospheric pressure by virtue of a vent opening or pipe which vents to the atmosphere. As the material is conveyed down the conveying line 13 in the manner previously described, when the conveying air reaches the storage silo 17 and is vented out to the atmosphere, it must first be filtered by a dust collector or filter arrangement 18. Details of the construction of the filter or dust collector 18 are not included because they are not important to understanding the instant invention and do not form a part of the instant invention. One of ordinary skill in the art can readily select a suitable type of dust collector or vent filter to do the job required. However, it is important to know that the filter or dust collector 18 must be capable of accommodating and cleaning out the air that passes through it at the rate at which the air passes through it. The dust collector or filter 18 also must be capable of withstanding the force of any surge of air that might normally be encountered in the pneumatic conveying system.

Figure 2:
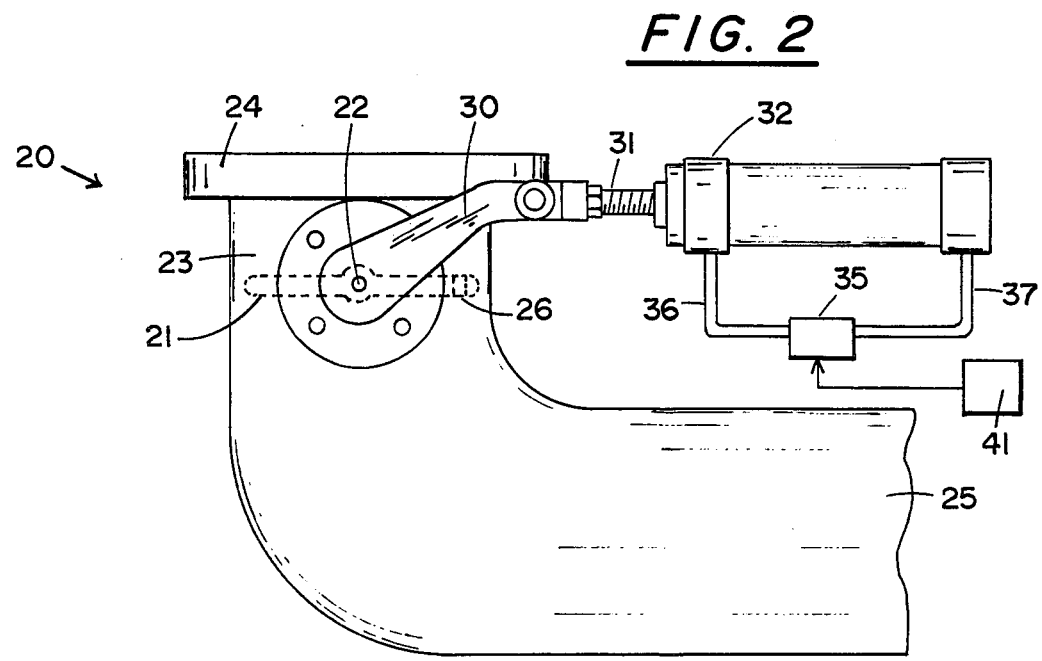
FIG. 2 shows the shut-off valve in greater detail and illustrates an air cylinder for operating the shut-off valve.

Located in the conveying line 13 near the outlet of pressure vessel 10 is a valve 20. Typically, the valve is what is known commonly as a butterfly valve and is shown in greater detail in FIG. 2. A disk 21 is pivotally mounted by shaft 22 within housing 23. The housing has an inlet opening at 24 through which the material from the pressure vessel 10 enters and has an outlet opening 25 through which the material continues into the conveying line 13. When the disk 21 is swung to the open position the material and the air from the pressure vessel 10 pass normally into conveying line 13. When the disk 21 is swung to the closed position, it stops the flow of material and air from the pressure vessel 10 to conveying line 13. The disk 21, however, is provided with a small opening 26 which allows air to continue to pass from the pressure vessel 10 to the conveying line 13 even when disk 21 is in the closed position. In this fashion then, some of the air from the pressure vessel which is moving the granular material down the conveying line continues to perform its function, however, the opening 26 limits the flow rate of the air. The size of the opening 26 has to be determined for each installation and depends, inter alia, upon the air pressure being applied and the degree to which the air flow rate is to be limited.

Typically, with no limitation thereto being intended, the disk 21 of valve 20 is operated by an air cylinder 27. The details of the construction of the air cylinder are not important to an understanding of the invention so are not described herein. Suffice is to point out that arm 30 which is connected to a piston 31 within the air cylinder body 32 is attached at its other end to shaft 22 of valve 20. When the hydraulic piston 31 moves in and out of the cylinder 32 the shaft 22 is correspondingly rotated to either open or close disk 21. Air cylinder 27 is operated in the usual and well known fashion by a solenoid 35 being electrically controlled to open and close air lines or hoses 36 and 37 which respectively feed pressurized air into the cylinder to move piston 31 back and forth.

Figure 3:
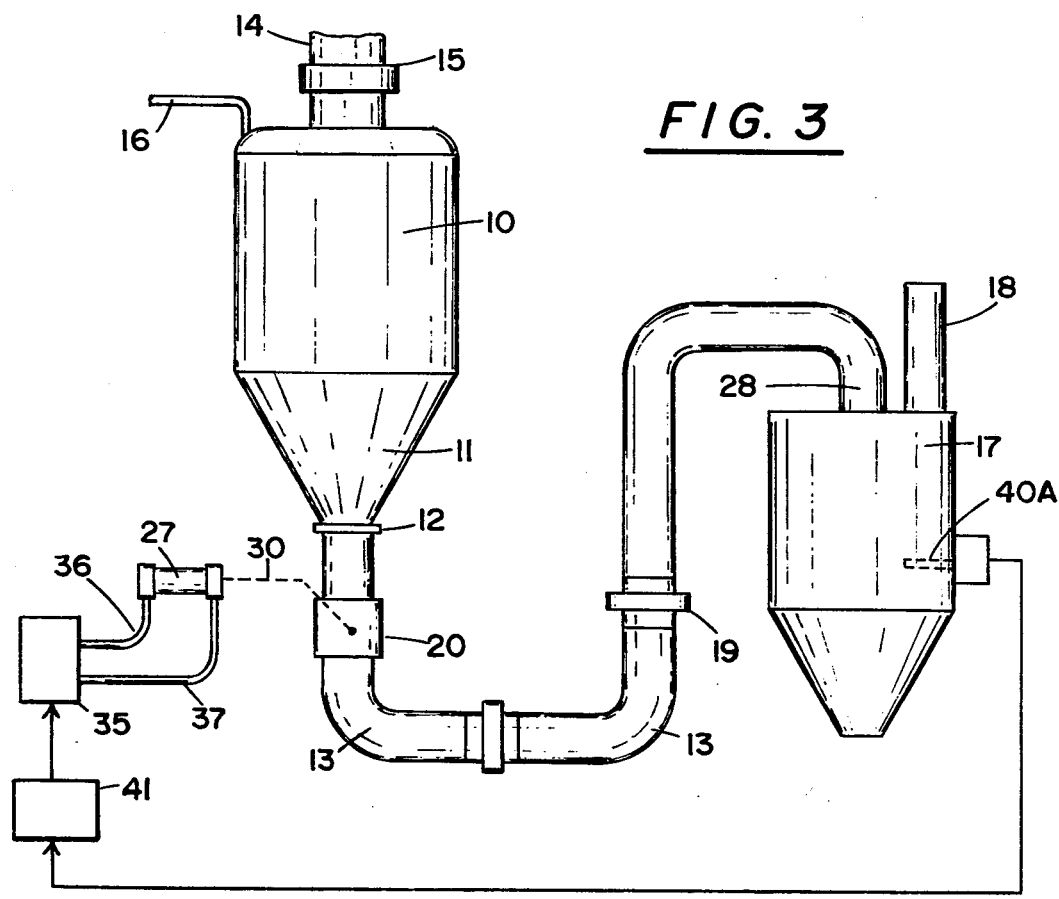
FIG. 3 is a variation of the system shown in FIG. 1 with the sensor located downstream of the shut-off valve.

Referring back now to FIG. 1, solenoid 35 receives its electrical signal from a sensor probe 40 which is located, preferably, inside the lower conical portion 11 of the pressure vessel 10. The sensor probe 40 can be any of a number of well known devices which are capable of performing the necessary function. The sensor probe 40 determines when the granular material has virtually completely left the transporter 10 and provides an electrical signal through the control box 41 to solenoid 35 telling the solenoid to operate the air cylinder 27 to close the disk 21 in valve 20. While the selection of a suitable sensing probe is a matter of choice and the choice may depend upon the specific application, typically, as an example with no limitation being intended, probe 40 may be a capacitance type of transducer that senses when the material reaches a certain level and then provides an electrical signal to a relay which, in turn, then causes the relay to actuate and deliver a further electrical signal to operate the solenoid valve. It is also possible to incorporate a delay device within the electrical circuitry of the sensing probe to provide a delay between the time the probe senses the level of the material and when the eventual solenoid actuating signal is developed. Typically, a probe of this nature is manufactured by Drexelbrook Engineering Company of Horsham, Pennsylvania and is identified as its Series 507-1000 level control. If the sensing probe 40 is located within pressure vessel 10, then it is preferred that there be a short delay before valve 20 is closed when the probe senses that the material has left the vessel. This permits any small amount of the material that may still be in the transporter 10 to leave and pass by valve 20 before the valve is closed. Alternatively, if, the sensor is located beyond or downstream from valve 20 in conveying line 13, such as probe 40A located in the receiver silo 17 as shown in FIG. 3, then ordinarily a delay is not necessary. In any event, probe 40 senses when the level of the material is such that the pressurized air in the pressure vessel 10 is likely to meet a decreasing resistance which could result in a pulse or surge of air and material through conveying line 13 reaching the input to silo 17. Valve 20 is closed to prevent the pressurized air in the vessel 10 from leaving the vessel at an accelerated rate. However, the leakage opening 26 permits the pressurized air to continue to pass by and through valve 20 to continue conveying the material down the conveying line 13 to silo 17, however, the air rate is limited and the pulse or surge which otherwise would appear is virtually eliminated.

In a typical installation for conveying sand from a transporter to a storage silo, approximately 35 lbs. per square inch air pressure is used in the transporter vessel 10. For sand, typically this will create a flow rate of the sand at about two cubic feet per minute or in the range of about 200 lbs. per minute. The air moves down the conveying line as it is moving the sand at the rate of about 50 cubic feet per minute. These are typical normal rates and pressures in a system of this nature. As the vessel starts to empty and the material in the conveying line becomes less dense, the pressurized air in vessel 10 meets less resistance so its rate of flow tends to increase. Typically, at this juncture, where the conveying cycle is drawing to a close so that most of the material has left the transporter 10 and has been carried to the storage silo, the air may be escaping down the conveying line to atmosphere at the rate of about 75 cubic feet per second. This high surge of air appears at the dust collector or filter in the storage silo or receiver. Using the shut-off valve with the by-pass or leakage hole in this typical example results in the air escaping at the end of the conveying cycle at a rate of about 2 ½ cubic feet per second, which is only slightly higher than the normal rate during the heart of the conveying cycle. Naturally it is important not to limit the air flow rate too much because then it might extend the time of the conveying cycle beyond an acceptable limit.

I claim:

1. In a system for pneumatically conveying granular materials, said system including a source vessel containing material to be conveyed and pressurized gas for conveying the material, a receiver, and a conveying line between said source vessel and the receiver, the improvement comprising: a valve located in the conveying line for limiting flow of gas between the source vessel and the receiver, said valve containing a passageway for allowing limited flow in the conveying line when the valve is closed; means for sensing the amount of material being conveyed; and means coupled to said valve and responsive to said sensing means for closing the valve when the amount of material is sensed at a predetermined level.

2. The invention as set forth in claim 1 wherein the sensing means is located in the conveying path upstream of the valve and further includes means for delaying closing said valve until substantially all of the material has passed by the valve.

3. The invention as set in claim 1 wherein said sensing means is located in the conveying path downstream of the valve.

4. In a system for pneumatically conveying granular materials, said system including a source vessel containing material to be conveyed and pressurized gas for conveying the material, a receiver, and a conveying line between said source vessel and the receiver, the improvement comprising: a valve located in the conveying line for impeding the flow of gas between the source vessel and the receiver, said valve containing a passageway for allowing limited flow in the conveying line when the valve is closed; means located at the source vessel for sensing the amount of material at the source vessel; and means attached to said valve and responsive to said sensing means for closing the valve when the material is sensed at a predetermined amount.

5. The invention as set forth in claim 4 further including means for delaying closing the valve until a period of time after the material is at the predetermined amount.

6. The invention as set forth in claim 4 further including means for delaying closing the valve until substantially all of the material has passed by the valve.

* * * * *